United States Patent Office 3,495,965
Patented Feb. 17, 1970

3,495,965
MECHANICAL CUSHION FOR PISTON TYPE
GLASS PRESSING APPARATUS
Arthur E. Kurtz, New Providence, Pa., and William C.
Goelzer, Vineland, N.J., assignors to Armstrong Cork
Company, Lancaster, Pa., a corporation of Pennsylvania
Filed Aug. 7, 1967, Ser. No. 658,677
Int. Cl. C03b 11/00
U.S. Cl. 65—318                                    1 Claim

ABSTRACT OF THE DISCLOSURE

Apparatus for absorbing the kinetic energy of components which move from one dwell position to a second dwell position. Specifically, the apparatus is utilized with the movable parison mold and neck ring mold of a hollow glassware forming machine. Spring-type shock absorbers are used to absorb kinetic energy as the operating components move into dwell positions.

BACKGROUND OF THE INVENTION

Field of the invention

The application is directed to apparatus for mechanically absorbing kinetic energy. Specifically, the apparatus is applied to a hollow glassware forming machine for absorbing kinetic energy of the intermittently moving components of the machine.

Description of the prior art

The application is directed to improvement type apparatus to be placed on the glassware forming machine set forth in Patent No. 3,329,492. While such apparatus may have specific use to the glassware forming machine of that patent, said apparatus would have general utility to other machines which must have a method of absorbing kinetic energy without a decrease in operating speed and without a sacrifice of accuracy in the positioning of components at a dwell position.

The particular glassware forming apparatus set forth in the above patent is not provided with any impact absorbing mechanism to arrest the kinetic energy of the moving components when they move into their dwell position. Consequently, the movement of the parison mold and the neck ring holder from their one dwell position to their second dwell position results in a large impact load being placed upon the operating components of the machine. These impact loads are particularly detrimental when the parison mold moves to its lower position and the neck ring holder moves to its lower position. The repeated impact loads, when these elements reach the above-mentioned positions, result in excessive strain being placed on the operating components. This is particularly true when the machine of the patent is run at a particularly high operating speed to secure large volume production. The impact loads cause a weakening in the operating structure of the machine and then affect detrimentally, in a short period of time, the accurate positioning of these elements for the forming of the parison.

The application is particularly directed to means for absorbing the kinetic energy of the parison mold and neck ring holder when it approaches its critical dwell positions, so that excessive impact loading is not applied to the operating components of the machine. This then permits the machine to be run at a high production volume and to maintain, over a long period of time, its necessary high degree of accuracy to provide acceptable parisons.

SUMMARY OF THE INVENTION

The invention is directed to apparatus for absorbing the kinetic energy of the moving components when they approach their dwell position. Specifically, the apparatus is directed to a spring-type shock absorber used to rapidly decelerate the movement of the neck ring holder as it approaches its lower dwell position to lessen the impact occasioned by the arresting of the kinetic energy of the neck ring holder as it reaches its dwell position. Also, the apparatus utilizes a spring-biased impact plate to lessen the impact loading resulting during the downward movement of the parison mold to its lower dwell position. Such structure results in a rapid deceleration of the parison mold as it approaches its downward dwell position.

It is the use of the above impact load arresting structures which permits the operation of the glassware forming machine of the above-mentioned patent at a production rate necessary to produce a satisfactory quantity of glassware. Also, such features greatly diminish the wear which normally accompanies high impact loading so that the operating components are able to position the necessary mold units in position in space within a tolerance of .005" over a prolonged period of time. Such high degree of accuracy is necessary to maintain a high quality production and could not be maintained except by running the machine of the patent at a very low production rate.

DESCRIPTION OF THE PREFERRED EMBODIMENT

Figure 1:
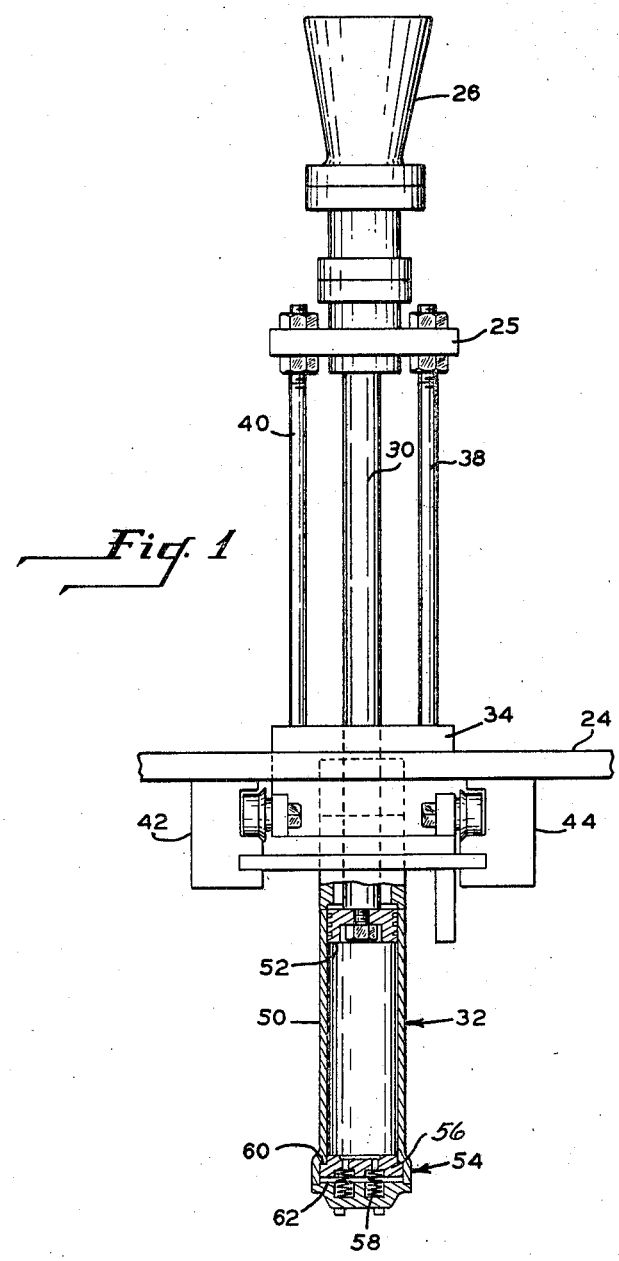
FIGURE 1 is a side view, partly in section and broken away, illustrating the invention as applied to the parison mold.
Figure 2:
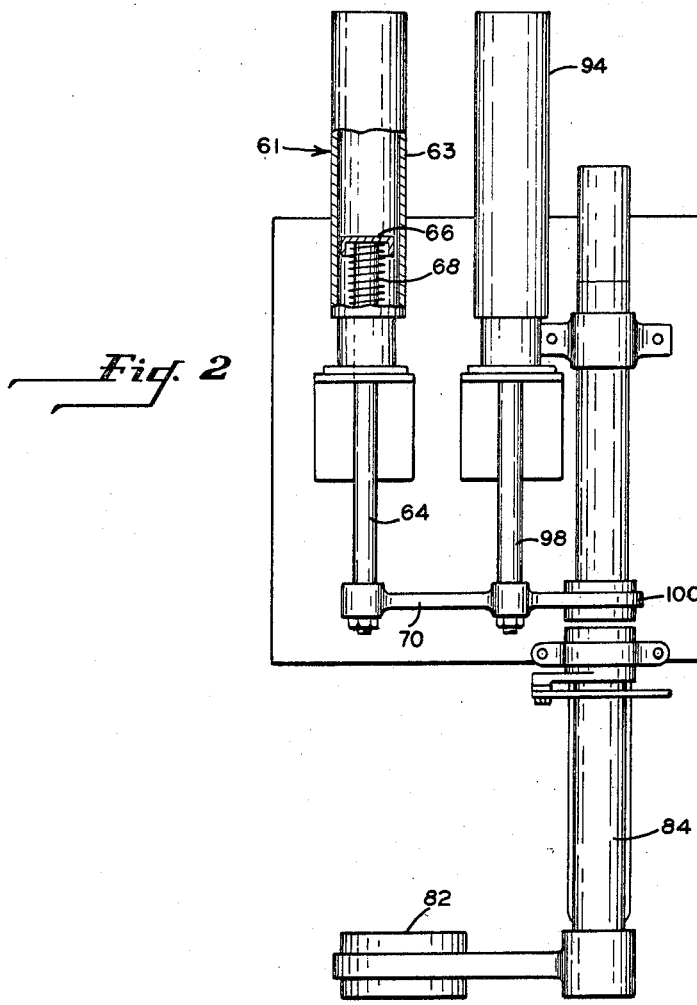
FIGURE 2 is a side view, partly in cross section and broken away, illustrating the invention as applied to the neck ring holder operating structure.

The invention is directed to specific improvements in the operating structure of the hollow glassware forming apparatus set forth in Patent No. 3,329,492. FIGURE 1 specifically shows the improvement to the parison mold which is set forth in FIGURE 8 of the above-mentioned patent, while FIGURE 2 is directed to the improvement in the neck ring holder structure as set forth in FIGURE 11 of the above-mentioned patent.

Referring to FIGURE 1, the parison mold 26 is carried by a yoke 25 on the upper end of an operating rod 30. Guide rods 38 and 40 assist in the accurate positioning of the parison mold in its upward position. A carrier 34 serves as the guideway for rods 38 and 40. When the parison mold moves to its lower position, the arresting of the downward motion is accomplished by the striking of the yoke 25 against the upper surface of the carrier 34. It is the action of yoke 25 against carrier 34 that generates the excessive impact load which tends to rapidly deteriorate the operating components for the parison mold.

The operating components are mounted below plate 24 and comprises primarily a fluid cylinder 32 and guide rails 42 and 44 which support the carrier 34. The fluid cylinder 32 is used for securing the upward and downward movement of the parison mold while the carriage 34 and its associate guideways and operating mechanism are used to secure a lateral movement of the parison mold between the parison forming position and the glass gob loading position. Rapid and excessive wear to the fluid cylinder and the guide rail structure results from the heavy impact of the yoke against the carrier. This then prevents the apparatus from maintaining its accurate positioning of the parison mold in its upward position to a tolerance of .005" relative to the other structure necessary to form the parison.

The fluid cylinder 32 contains the conventional hollow wall structure 50 with the conventional operating rod and piston 52. Movement of the piston 52 between its upper and lower positions within the cylinder 50 results in movement of the parison mold between its upper and lower positions. The weight of the assembly pushed upward by the piston 52 tends to counteract to a degree the upward force applied to the piston and, consequently, diminishes the impact load that occurs when the parison mold is stopped at its upper dwell position. However, when the parison mold is moved to its lower position, the weight of the parison mold assembly contributes to the force which tends to move the piston downward and thereby results in a rather large force operating to move the parison mold to its lower position. Without the structure of this application, the patented structure results in a very large impact load being applied by yoke 25 against carrier 34 due to the arresting of the kinetic energy of the downwardly moving components as the parison mold moves to its lower dwell position.

This impact load is greatly reduced by the mechanical cushion 54 set forth in FIGURE 1. The mechanical cushion consists of an impact plate 56 which is spring loaded in an upward position by springs 58. Stops 60 limit the upward movement of the impact plate while stops 62 limit the downward movement of the impact plate. The apparatus is so constructed that the impact plate 56 rests against the stops 62 at the same time the yoke structure 25 rests against the carrier 34. Consequently, as the piston 52 moves to its lowermost position, it engages the impact plate 56 in its raised position, and the final downward movement of the piston 52 requires the piston to overcome the spring load generated by the springs 58. The overcoming of the spring force generated by springs 58 results in a rapid deceleration of the piston 52 with a resulting decrease in the impact load on the operating structure as the parison mold reaches its downward dwell position.

It will be apparent that either the upper or the lower stop may be used as the reference point for limiting the position of the impact plate when the parison mold is in its dwell position. When the spring force of springs 58 is greater than the force holding the parison mold in its lower position, the springs will force the impact plate up against stops 60 while with a lower spring force, the impact plate would be held against the lower stops 62. Naturally, the use of a greater spring force will result in a greater decrease in the impact loading and provide a rest position with the yoke 25 raised above the carrier 34.

As shown in FIGURE 3 of Patent No. 3,329,492, the parison mold and neck ring holder meet in space to form a mold structure for the generation of the parison. Alignment between the parison mold and the neck ring holder must be within .005" to result in the formation of a satisfactory parison. While decreasing of the impact loading on the parison mold will help secure more efficient operation of the glass forming apparatus of the patent, additional efficiency can be secured by likewise securing a decrease in the impact loading to which the neck ring holder is subjected.

Referring to FIGURE 11 of the patent, the neck ring holder is shown in its lower position wherein it has placed the parison in the blow mold. Here again we are faced with a rapid downward movement and a sudden stopping at a dwell position with the resulting large impact load being placed on an operating structure in its extended position. The mass of the neck ring holder and its operating structure compounds the normal force moving the neck ring holder to its downward position resulting in a large impact load, whereas upward movement of the neck ring holder has the mass of the neck ring holder and its components tending to balance the force moving the neck ring to its upper position. It was noted that the neck ring in its extended position also had a tendency to vibrate laterally.

As indicated in FIGURE 11 of Patent No. 3,329,492, the neck ring holder 82 is connected to a vertical element 84. Power cylinder 94 through rod 98 and bracket 100 is used to cause the up-and-down movement of vertical member 84 and the neck ring holder 82.

In order to lessen the impact loading and lateral vibration as the neck ring holder moves to its lower position, a mechanical cushion structure 61 is provided. This structure comprises a cylinder 62 containing therein a rod 64 having a cup-shaped retaining plate 66 fastened to its upper end within the cylinder 63. A compression spring 68 is mounted between the bottom wall of the cylinder and the plate 66. Downward movement of the rod 64 results in compression of the spring 68. A bracket 70 connects rod 64 with piston rod 98 so that both these rods move simultaneously as a unit. Consequently, as rod 98 moves the neck ring 82 into its lowermost position, the spring 68 is being compressed. The compression of the spring 68 results in a deceleration in the downward movement of the neck ring holder 82 and, consequently, a lessening in the impact load on the neck ring control components as the neck ring reaches its lower dwell position.

As a result of the embodiments set forth above, the impact which is occasioned by the arresting of the kinetic energy of a moving component is absorbed by a mechanical-type cushion. By the absorbing of this kinetic energy, the operating components are not subjected to excessive wear, and the operating speed of the apparatus may be greatly increased without the danger of high impact loads greatly decreasing the accuracy of the operating components.

We claim:
1. In combination with an apparatus for forming hollow glassware wherein the parison mold moves from a lowered position for receiving a glass charge to an elevated position for forming of the parison and wherein the neck ring holder moves with a rotary and reciprocating motion from a raised position for forming a parison to a lowered position for blowing the hollow glassware, a mechanical cushion for diminishing the downward movement of the parison mold as it approaches its lower dwell position, said cushion comprises a fluid power cylinder wherein an impact plate is positioned in the cylinder at the end of the cylinder opposite to the end through which the piston rod passes, plural stop means limiting movement of the impact plate toward and away from the end of the cylinder, spring means between the impact plate and the end of the cylinder, said stop means adjacent the end of the cylinder functioning to limit movement of the impact plate in a direction to compress the springs when the impact plate is engaged and pushed by the piston, and other stop means limiting movement of the impact plate when the piston moves away from the impact plate whereby final movement of the piston towards the end of the cylinder is cushioned by the impact plate and its spring biasing structure, and a mechanical cushion for diminishing the downward movement of the neck ring holder as it approaches its lower dwell position, said last-mentioned cushion comprises a cylinder with a plate fastened to a rod, said rod is fastened to the neck ring holder arm assembly, a spring is disposed between the plate and one end of the cylinder, said plate acts against said spring to diminish the downward movement of the neck ring, whereby the combination of the glassware forming apparatus with the parison mold cushion and neck ring holder cushion results in a diminishing of the impact of the parison mold and neck ring holder against their operating structures.

References Cited

UNITED STATES PATENTS

| | | | |
|---|---|---|---|
| 458,191 | 8/1891 | Ripley | 65—305 |
| 650,722 | 5/1900 | Jones et al. | 65—246 |
| 792,500 | 6/1905 | Cox et al. | 65—361 XR |
| 1,897,581 | 2/1933 | McNab | 92—60 XR |
| 2,061,663 | 11/1936 | Lauck | 65—361 |
| 2,402,887 | 6/1946 | Greeley | 92—60 |
| 2,953,223 | 9/1960 | Dillenburger et al. | 92—60 XR |

FOREIGN PATENTS 1,045,365  6/1953  France.

FRANK W. MIGA, Primary Examiner

U.S. Cl. X.R.

65—246, 231, 322, 361; 92—60, 85